Patented July 17, 1928.

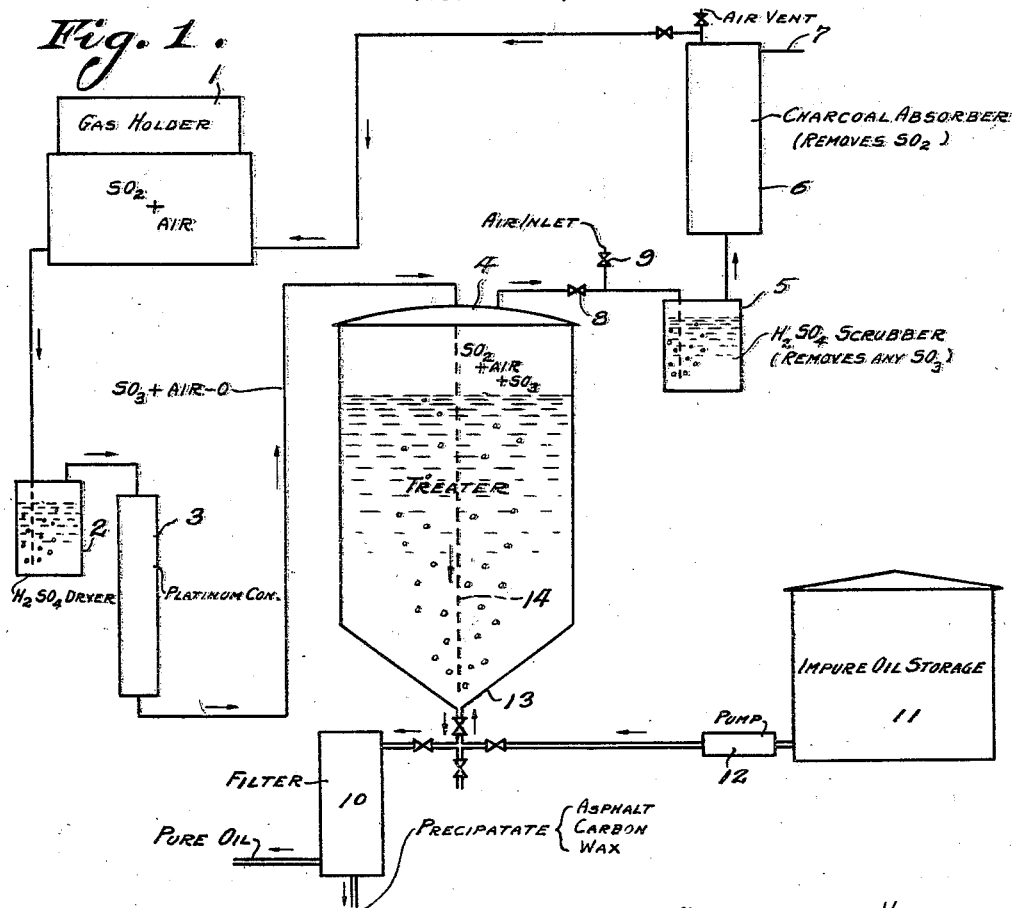
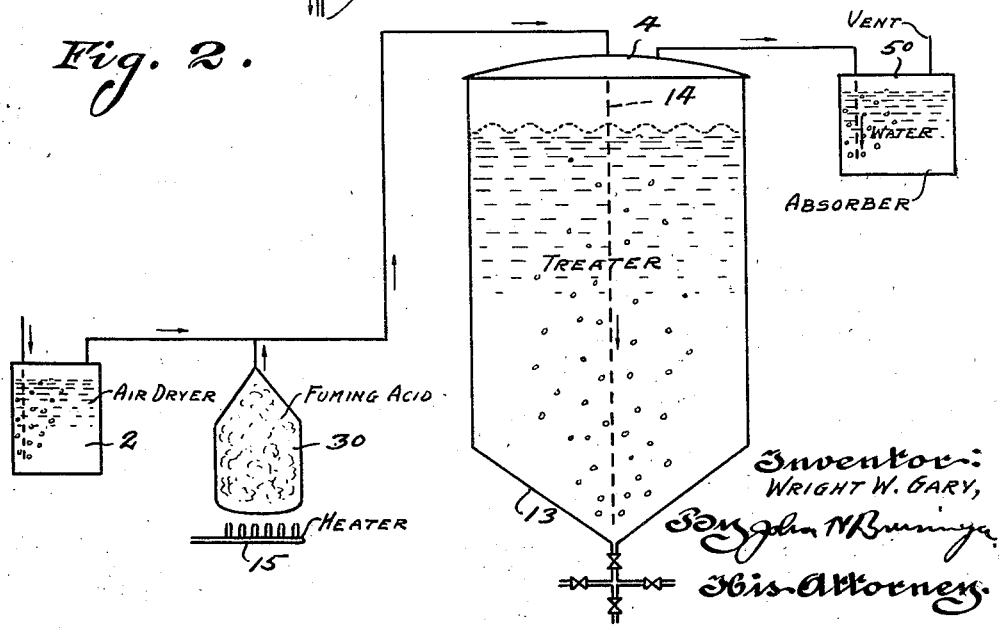

1,677,440

UNITED STATES PATENT OFFICE.

WRIGHT W. GARY, OF LOS ANGELES, CALIFORNIA, ASSIGNOR OF ONE-HALF TO CHARLES O. MIDDLETON, OF LOS ANGELES, CALIFORNIA.

PROCESS OF TREATING PETROLEUMS.

Application filed June 7, 1926. Serial No. 114,078.

This invention relates to the treatment of organic compounds, primarily of the petroleum group, to purify them of constituents and compounds which, by their chemical bond, with or presence in the desired organic oil or substance are objectionable, but which in themselves are of commercial value and may be recovered.

All petroleum oils are known to contain impurities or objectionable compounds in the nature of carbon forming compounds, waxes, asphalts or asphaltenes, sulfur and nitrogen oils and compounds, and others which are difficult to remove. I have found that these compounds are readily subject to oxidation, decomposition or polymerization; the presence of these compounds is the chief cause for the inferiority of products made from oils, shales, or petroleums of unstable or impure nature. Sulfur and sulfur compounds, which themselves are oils or oil soluble, are recognized as one group of objectionable impurities the removal of which is highly desirable.

The characteristics of sulfur compounds in petroleum oils, and similar substances obtained from the various oil fields, such as Canada, Ohio and California, it is found, are to some extent similar, though marked by chemical differentiation. In fact the dominant characteristic of all these surfur compounds in whatever combination they may be present, is their ready susceptibility to oxidation with decomposition, liberation or separation. I have discovered that petroleum oils, shales and other organic substances may therefore be freed completely of their sulfur content or constitutents and the pure oils of stable character may be produced from petroleums, shales, or organic substance which by reason of the sulfur constitutents are impure and unstable. There are certain other compounds, however, contained in petroleum oils, shales and other organic substances, which after a period of standing undergo oxidation and which eventually precipitate as insoluble residues or resinous compounds the nature of which are not yet definitely established. In gasoline, kerosene and distillates of all natures, these compounds upon standing oxidize, polymerize and darken the oil with some additional precipitation. Treatment of the oils or substances containing these compounds by the usual sulfuric acid or modified methods, removes some of them, but there are others which do not respond to these treatments and which consequently are not removed, their presence in the oil then causing the undesirable oxidation, polymerization, precipitation or darkening. Furthermore the sulfuric acids or modified treatments produce acid sludges which are unfit for any purpose, except perhaps as fuel, and in most cases are therefore waste.

I find that the petroleum oils and their products may be primarily treated to expel the compounds which render the oil naturally impure, without the formation of acid sludge, and due to the lack of acidity these compounds may be readily recovered and are of commercial value. This is of great importance, especially in the case of making lubricating "bright stock" from an impure and asphalt base crude. By ordinary sulfuric acid or modified treatments to remove the asphalt, tars, etc., the losses due to acid sludge are so large that the operation is practically uncommercial, those losses in some cases being as high as 60% of the original stock treated. Also very slight sulfur removal is effected giving the finished lubricating oil secondary quality, due to unstability. Cracking stock in particular may be purified by removing those compounds and constituents which render the oil impure and unstable and which decompose in cracking, forming undesirable impure compounds (olefines, di-olefines, mercaptans) of foul odor and of very unstable nature. The removal of these newly formed impurities and objectionable compounds requires extensive processing in order to improve the cracked products sufficiently for sale, and again the losses due to acid sludge are large. I find that by preliminary purifying a cracking stock, the stock, when subsequently cracked, yields converted products of superior quality, good odor and stable nature.

One of the objects of this invention, therefore, is to provide a simple and economical process by which stable, pure products may be manufactured, without acid sludge losses, and with formation of by-products of commercial value.

Further objects will appear from the detail description in connection with the accompanying drawings, in which:

Figure 1 is a diagram of an apparatus adapted to perform the process embodying this invention and illustrating one of the embodiments of this invention; and Figure 2 is a similar diagram illustrating another embodiment of this invention.

I have discovered that certain compounds of organic nature and naturally contained in petroleum oils and shales, which render them impure, are susceptible of conversion into, either compounds which are the organic insoluble homologues of those impure or undesirable compounds, or into nucleus compounds minus the impure element. The former conversion results in these converted compounds being precipitated from the substance or liquid from which they are removable by any well known means, as by filtration, or by centrifuging, while the latter group remain as the purified nucleus compounds in the substance or liquid. These conversions are accomplished by controlled oxidation sufficient to complete the chemical reactions desired but not strong enough to give detrimental effects to the substance, namely major decomposition of the nucleus compounds including dehydrogenation. This is most advantageously brought about by the use of concentrated or diluted nascent oxygen, which is caused to evolve from an oxidizing gas, such as the gaseous anhydride of an oxidizing acid or from activated oxygen. The active or nascent oxygen generated combines with the sulfur impurity forming sulfur dioxide and at the same time acting upon the undesirable compounds contained in the substance or oil to oxidize or convert them into their insoluble homologues causing separation by precipitation. I have found that any anhydride of an oxidizing acid may be used to effect the purpose of the invention provided that the substance to be treated and the gas used is absolutely dry or anhydrous and that the oxidizing agent is kept in a gaseous state.

An example of this is the action of an oxidizing gas on the type of sulphur compounds found.

I. In Ohio petroleum called di alkyl sulphides.

Their general formula is:

$$(C_nH_{2n+1})_2S$$

Or pentyl sulphide (an example)

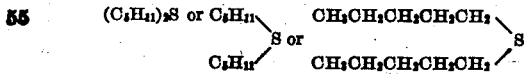

When properly oxidized, $$(C_5H_{11})_2S + O_2 \rightarrow C_5H_{10} + SO_2$$

Consequently the di alkyl sulphides in general as a group react as $$(C_nH_{2n+1})_2S + O_2 \rightarrow C_nH_{2n+2} + SO_2$$

II. In Canadian oils the sulphur compounds are found to be slightly different in chemical formula, as a group called thiophanes. Their general formula is:

$$C_nH_{2n}S$$

Or Heptyl thiophane (an example).

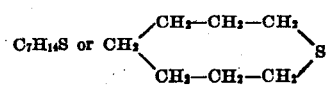

and when oxidized properly, $$C_7H_{14}S + O_2 \rightarrow C_7H_{14} + SO_2$$

Consequently the thiophanes in general as a group react as $$C_nH_{2n}S + O_2 \rightarrow C_nH_{2n} + SO_2$$

III. Some oils are claimed to have thiophanes $$C_nH_nS$$

and the reaction is represented by

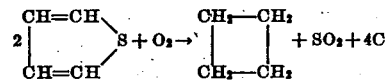

which might account for free carbon in oxidizing some oils.

IV. When $H_2S$ gas is dissolved in the oil as is found in Mexican crude, the gas reacts as $$2H_2S + 3O_2 \rightarrow 2H_2O + 2SO_2$$

V. When mercaptans are present in oil such as in cracked oil and Russian oil, the reaction is $$C_nH_{2n+1}SH + O_2 \rightarrow C_nH_{2n+1} + SO_2$$

or more probably $$2C_nH_{2n+1}SH + 3O_2 \rightarrow 2C_nH_{2n+1}OH + 2SO_2$$

forming an alcohol or aldehyde, neither of which is detrimental.

Referring to Example I, the product after desulphurizing is $C_nH_{2n+2}$ or a paraffin, and in Example II $C_nH_{2n}$ or a naphthene. These compounds are stable and are the main constituents of pure oils. Example III shows the formation naphthenes and Example V either paraffines or alcohols. If alcohols are formed they are of great benefit as fuels and are not detrimental in any oil being very stable.

One of the oxidizing agents which can be conveniently employed is sulfuric anhydride $(SO_3)$; the oxidization is then effected to the following equations:

(1) $(C_nH_{2n+1})_2S + 2SO_3 \rightarrow C_nH_{2n+2} + 3SO_2$ (2) $C_nH_{2n}S + 2SO_3 \rightarrow C_nH_{2n} + 3SO_2$ (3) $2C_nH_nS + 4SO_3 \rightarrow C_nH_{2n} + 6SO_2 + C_n$ (4) $H_2S + 2SO_3 \rightarrow 3SO_2 + H_2O$ In using sulfuric anhydride special precautions must be used, namely that the gas is dry or anhydrous, and also that the temperature of both the oil and the substance to be treated is sufficiently high to ensure no condensation of sulfuric anhydride during its passage through the treater, for in the event that condensation takes place the time factor governing the degree of oxidization is sufficiently increased to cause dehydrogenation of the hydrocarbon compounds with the resultant formation of water which combines with the sulfuric anhydride making sulfuric acid. Sulfuric acid, or any acid, is detrimental from both a chemical and economical standpoint. From a chemical standpoint esters of the acid are formed, which are partially soluble in the substance resulting in an impure finished product, while from an economical standpoint the precipitates formed are converted into acid sludges, dissolving with them a certain quantity of good oil, and also making a sludge of little or no commercial value.

I will now describe my process in connection with the use of a specific gaseous agent which will release active or nascent oxygen or which upon contact with impure petroleums or oils containing undesirable compounds, will decompose, either wholly or only partially, liberating an oxygen atom or molecule, which in the nascent or active state exercises great chemical activity upon the substance and oxidizes those compounds thereof which make it impure. An example of such an agent is the afore-mentioned sulfuric anhydride, ($SO_3$), in gaseous state. This compound boils at 112.6° F. Therefore, when using this gas, the temperature of the substance or oil to be treated should be above that temperature at which the sulfuric anhydride would boil, or above which this gas or any other gas used for the purposes of this invention, would condense. A temperature of say 140° F., or above, I find, is suitable for treating oils when using sulfuric anhydride. If the temperature falls below that at which the oxidizing agent would remain a gas, condensation of this agent would occur, with the result that the strong oxidizing action of the condensed $SO_3$, would remain in the oil or substance for a longer period of time causing dehydrogenation of the substance with the resultant formation of water, and the sulfuric anhydride combining with the water thus formed, forms sulfuric acid, thus:

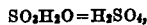

a compound which I wish to avoid at all times, owing to the undesirable sludges formed and thrown down, which are strongly acid and tend to sulfonate the oil or substance. It is not the purpose of my invention, at any time, to treat the oil with an acid or an acid process; it is the formation of them in oil which the process primarily avoids, the reaction being only to oxidize the undesirable compounds in conjunction with the liberation or removal of sulfur. The condensation temperatures obviously vary with the anhydrous gases used. On the other hand, exceedingly high temperatures must also be avoided, because of the dehydrogenation upon the substance and the consequent formation of water. While air or molecular oxygen alone exerts an action upon the oil, it is not complete, and requires higher temperatures than can be used beneficially. Therefore, I may use, as another oxidizing gas, active or ozonized air or oxygen. The anhydrous gas used by me as a constitutent in the process of oxidizing the undesirable bodies, compounds or constitutent of and in the oil, is introduced into and through the body of the oil, which is maintained at the proper temperature.

If for economic reasons, sulfur trioxide is manufactured by the passing of sulfur dioxide and dried air in the well known manner, over heated spongy platinum or platinum black, such as is employed in the manufacture of sulfuric acid by the contact process, the resultant gas is introduced into the treater as sulfur trioxide plus air minus its oxygen content, the oxygen having been used in converting the sulfur dioxide to the trioxide. The air minus its oxygen content is then a diluent to the active gas and is beneficial to the extent that the diluent controls the activity of the oxidizing agent. In most cases a diluent gas is therefore of advantage, but is not imperative. When the treating gas is forced through the liquid to be treated the chemically active gas frees part of its oxygen, which combines with the sulfur in the oil to form sulfur dioxide, passing out of the treating chamber. Another portion of the gas reacts upon the other undesirable compounds in the oil, subject to oxidation, and precipitate them from the oil. Any form of apparatus may be used, continuous or batch, examples of which are shown in the accompanying drawings, it is to be understood, however, that this invention is not limited to any particular apparatus, and that aparatus has simply been shown to illustrate the process. It will, therefore, be noted that the drawings are diametrical in form, but it will be understood that valves and other accessories will be provided wherever indicated and wherever required.

Referring now to Fig. 1, which illustrates one embodiment of this invention employing sulfuric anhydride, the operation will be as follows:

Starting from the gas holder 1 which contains a proper mixture of sulfur dioxide and air, this is conducted to a drier 2 to remove moisture. From the drier the mixture passes to a catalyst 3 which is in this case a platinum black tube maintained at a temperature of 600° F. where the sulfur dioxide and oxygen of the air combine and form sulfuric anhydride. This gas then passes to the treater 4, in which is contained the petroleum at a suitable temperature, for instance 150° F., where the sulfuric anhydride decomposes evolving nascent oxygen which oxidizes the sulfur. Precipitates are formed in the treater while the gases consisting of sulfur dioxide, air and some unconverted sulfuric anhydride pass to the scrubber 5 containing concentrated sulfuric acid which acts to absorb the unconverted sulfuric anhydride. The sulfur dioxide and air passes to a charcoal absorber 6 where it is absorbed and the air allowed to exit through an air vent 7. By manipulation of the valves 8 and 9 between the treater and the scrubber fresh air can be forced first through the scrubber and dried out and then through the charcoal absorber which is now hot and gives up its sulfur dioxide. This is continued until all the sulfur dioxide is removed from the absorber, the sulfur dioxide and fresh air passing into the gas holder for subsequent utilization. The dried oil is drained through the medium of valves and passed to the filter 10, from which it can be drawn. The treater is supplied from impure oil storage 11 from which it is delivered to the treater by a pump 12 as shown. The treater may be of any conventional type used in the refining of petroleum, and is suitably provided with a conical bottom 13 for the collection and accumulation of the products precipitated as a result of the actions occurring in the oil. The treater as a whole is suitably steam-jacketed for maintaining the temperatures required in treating. The oxidizing gas passes through the top of the treater and is conducted by a pipe 14 to the bottom where the gas evolves to bubble up through the oil in order to react therewith. After the chemical reaction has progressed to the desired point the gas is drawn off or stopped and the treater flushed with a diluent gas which is first dehydrated. When no more of the active gas or oxygen gas remains in the treater all gas is stopped and the charge allowed to settle or drained off as desired. The separation of the pure oil and the precipitate can be effected either by the use of a filter press or a centrifuge.

In Fig. 2, which also shows an apparatus for the treatment of petroleum utilizing sulfuric anhydride, the latter is obtained from fuming sulfuric acid in a container 30 provided with a heater 15, the sulfuric anhydride being evolved by heating the fuming acid. In this process dry air is used as a carrier, the air being passed through an air drier 2 and delivered to a line into which sulfuric anhydride is discharged. The exit gases can be absorbed by sulfuric acid in an absorber 50 and then by water, or by water alone in an absorber, forming respectively sulphurous and sulphuric acid. By using sulfuric acid as the first absorber, all unused sulfuric anhydride passes into the acid, forming again fuming acid which can be reused for evolving the oxidizing gas.

It will, therefore, be seen that the invention accomplishes its objects. A process is provided for not only freeing the petroleum of its impurities but for accomplishing the same in a simple and economical manner. The process enables the employment of standard equipment and losses are practically eliminated since there is no sludge formed. All products are of a commercial value and are not waste products since the precipitates contain products of commercial value such as carbons, waxes, asphalt and even nitrogen and sulfuric compounds which have commercial value. The purified petroleum itself is not only pure but also stable since dehydrogenation has been avoided. Not only can the process be utilized for the purification of petroleum generally but cracking stock can be purified which when afterwards cracked produces products of superior quality, color and without odor. Pure kerosene can therefore be made which is not true where the sulfuric acid treatment is utilized.

It will be understood that the apparatus may be of any suitable and usual construction and detail description thereof has been accordingly avoided. Moreover it will be understood that valve connections are provided where required and these have been generally indicated. However, those skilled in the art will know where to place valve connections, etc. Furthermore, while certain theories have been advanced it will be understood that these have been advanced for the purpose of facilitating the disclosure and not as being absolutely essential or necessary. It is, therefore, to be understood that this invention is not to be limited to any particular theory of operation. It is also obvious that various changes may be made in details without departing from the spirit of this invention; it is, therefore, to be understood that this invention is not to be limited to the specific details shown and described.

Having thus described the invention what is claimed is:

1. The process of treating petroleum, comprising, passing therethrough sulfuric anhydride maintained in a dry and gaseous state.

2. The process of treating petroleum, comprising, passing therethrough dry and gaseous sulfuric anhydride while the temperature is maintained above the condensation point of the sulfuric anhydride.

3. The process of treating petroleum, comprising, passing therethrough dry and gaseous sulfuric anhydride while the temperature is maintained above the condensation point of the sulfuric anhydride and below the dehydrogenation point of the petroleum.

4. The process of treating petroleum, comprising, passing therethrough diluted dry and gaseous sulfuric anhydride while the petroleum is maintained above the condensing temperature of the gas.

5. The process of treating petroleum, comprising, passing therethrough diluted dry and gaseous sulfuric anhydride while the petroleum is maintained above the condensing temperature of the gas and below the dehydrogenation temperature of the petroleum.

6. The process of treating petroleum, comprising, passing therethrough dry and gaseous sulfuric anhydride while the petroleum is maintained above 140° F.

7. The process of treating petroleum, comprising, passing therethrough diluted sulfuric anhydride maintained in a dry and gaseous state.

In testimony whereof I affix my signature this 1st day of June, 1926.

WRIGHT W. GARY.